May 17, 1938.  C. F. TERRELL, JR  2,117,922
INDICATOR AND METERING DEVICE
Filed Feb. 12, 1936
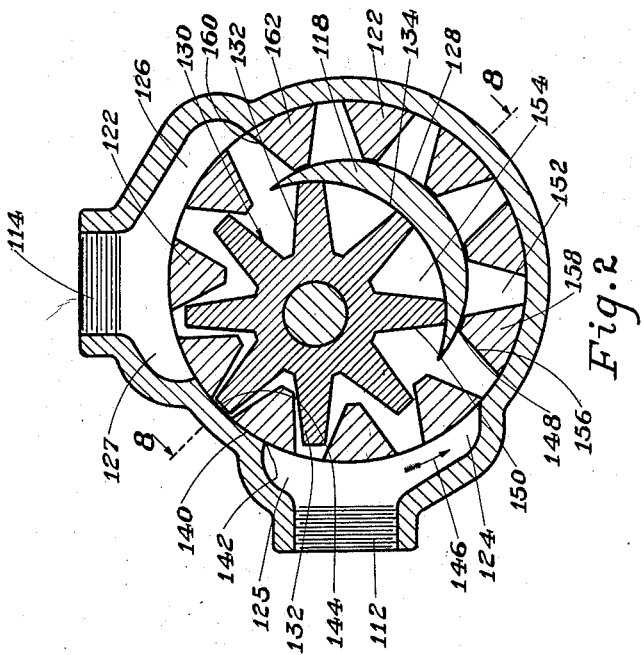
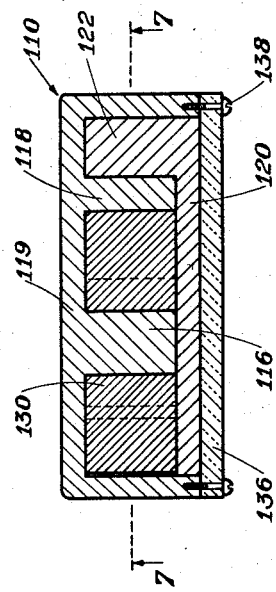
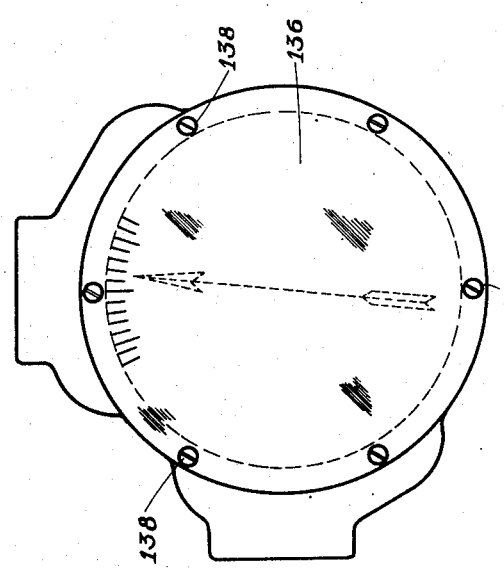
INVENTOR
Charles F. Terrell Jr.
BY Edward H. Lang
ATTORNEY Patented May 17, 1938

2,117,922

UNITED STATES PATENT OFFICE 2,117,922

INDICATOR AND METERING DEVICE

Charles F. Terrell, Jr., Chicago, Ill., assignor to The Pure Oil Company, Chicago, Ill., a corporation of Ohio Application February 12, 1936, Serial No. 63,514

1 Claim. (Cl. 73—261)

This invention relates to fluid flow meters and indicators and is more particularly concerned with meters and indicators of the rotary type.

It is customary to provide an indicator of some type on the delivery line of a force feed lubricator. The types of indicators generally in use show that the lubricator is pumping lubricant but do not provide means for determining the quantity of lubricant delivered or the rate at which it is delivered.

The object of my invention is to provide a rotary type fluid indicating and metering device suitable for use in connection with force feed lubricators, which is capable not only of indicating flow of fluid but also of permitting the quantity of fluid flowing therethrough to be observed and measured.

My invention may take many specific forms but in its broad aspect utilizes rotatable members arranged in a casing in such manner that in order for fluid to pass into and out of the casing, rotation of the member is necessitated. By mounting an indicator on a rotatable member, the quantity of fluid passing through the device can be readily observed. The device may be provided with suitable calibrations to show the volume of fluid passing therethrough. Since the device is intended primarily for use in connection with force feed lubricators which deliver lubricant in relatively small quantities, it is an easy matter to determine the rate of delivery by timing the revolution of the indicator.

The novel features embodied in my invention can be more clearly understood from the following description studied in conjunction with the accompanying drawing, of which Fig. 1 illustrates in front elevational view a form of device in accordance with my invention.

Fig. 2 is a vertical cross-sectional view of the device shown in Fig. 1, taken on the line 7—7 of Fig. 3.

Fig. 3 is a horizontal cross-sectional view taken on the line 8—8 of Fig. 2.

Referring to Figures 1 to 3, the numeral 110 indicates generally a casing of circular configuration cast with the inlet 112, outlet 114 on the side wall, and the pin 116 and quarter moon 118 protruding inwardly from the back 119. A disc 120 having upstanding, spaced teeth 122, is adapted to fit in the casing with the upper faces of the teeth adjacent the base or back 119 of the casing. The periphery of the disc corresponds substantially to the periphery of the inner side wall of the casing and is adapted to form a liquid seal therewith. The inlet 112 is enlarged at 124 and 125 and the outlet 114 is enlarged at 126 and 127 for reasons to be subsequently disclosed. The teeth 122 are of sufficient length to form a liquid seal between the surface 128 of the quarter moon and the inner side wall of the casing. The surface 128 corresponds to an arc having a center coincident with the center of the disc 120.

An idler wheel 130, having teeth 132, is rotatably mounted on the pin 116 in a position eccentric relative to the disc 120, and the outer edges of the teeth are adapted to form a liquid seal with the face 134 of the quarter moon and with the casing at position 140. The face 134 corresponds to an arc having a center coincident with the center of the pin 116. The teeth 132 are also adapted to mesh with the teeth 122 of the disc 120. A transparent cover 136, preferably of non-frangible composition, is adapted to be fastened to the front of the casing by means of screws 138. An arrow or other indicator may be stamped, painted, or otherwise applied to the face of the disc 120 contiguous to the transparent cover. Calibrations may be placed on the cover in circular fashion adjacent the point of the arrow or other indicator.

In operation, fluid is admitted through the inlet 112. When the disc 120 is in position 140, a seal is provided between the casing and the disc at the point 142 and likewise a seal is provided between the tooth of the idler 130 and the casing wall at the point 144, thereby preventing fluid from passing directly from the inlet to the outlet. The rotation of the disc and the idler in the direction shown by the arrow 146 will provide space for the fluid, and the gradually enlarging spaces between the idler and disc teeth will be filled with fluid. When the teeth of the disc and idler reach the positions 148 and 150, the fluid will be sealed in the spaces 152 and 154 until the spaces pass beyond the quarter moon, whereupon the teeth of the idler and the disc again begin to mesh and force the fluid from the spaces between the teeth out through the outlet 114. The effective surface exposed to inlet pressure is the face 156 of tooth 158. Likewise the effective surface exposed to outlet pressure is the face 160 of tooth 162. Since the effective areas exposed to inlet and outlet pressure are the same and the inlet pressure is greater than the outlet pressure, the disc and idler will be compelled to rotate in the direction of the arrow. The outlet 114 is enlarged at 126 and 127 to provide space for the oil trapped between the teeth to be ejected. It is necessary to have this enlargement since after the teeth pass the end of the quarter moon, the spaces between the teeth gradually become smaller due to the fact that the teeth approach more closely to each other, and if means of escape for the oil were not provided, a back pressure would be set up and the device would fail to operate.

Likewise, the enlargement of the inlet 112 at 124 and 125 is necessary to provide means for oil to enter the gradually increasing spaces between the teeth of the disc and the idler. If this enlargement were not provided the disc and idler would reach a position where the disc teeth formed a seal against further entrance of oil to the spaces which were gradually enlarging and a vacuum would be formed which would interfere with the proper operation of the device.

Although I have shown and described a modification of the device within the contemplation of my invention, it is to be understood that the invention is not limited to the specific device shown. The device shown in the drawing is by way of illustration only, the invention being intended to cover all devices within the scope of the claim annexed hereto.

What I claim is:

A fluid flow indicator consisting of a circular casing having a transparent removable cover and having an inlet and an outlet spaced from each other, an inwardly extending cylindrical boss formed on the back of said casing, said boss being positioned-eccentrically to the inner circumference of said casing, a circular toothed wheel rotatably mounted on said boss, the teeth of said wheel substantially touching the inner circular wall of said casing at one point, an arcuate, inwardly extending boss formed integrally with the back of said casing and located intermediate the first mentioned boss and the circular wall of said casing so that a face of the boss will contact the ends of said teeth, a disc of substantially the same circumference as the circular wall of said casing, floatingly mounted snugly between said bosses and said cover, said disc having circumferential crown teeth adapted to mesh with the teeth of said wheel at certain points and to contact the opposite face of said arcuate boss, and an indicator on the outer face of said disc.

CHARLES F. TERRELL, Jr.